March 25, 1947.  F. W. SIDE  2,418,052
MEASURING AND CONTROLLING APPARATUS
Filed Oct. 8, 1942  2 Sheets-Sheet 1
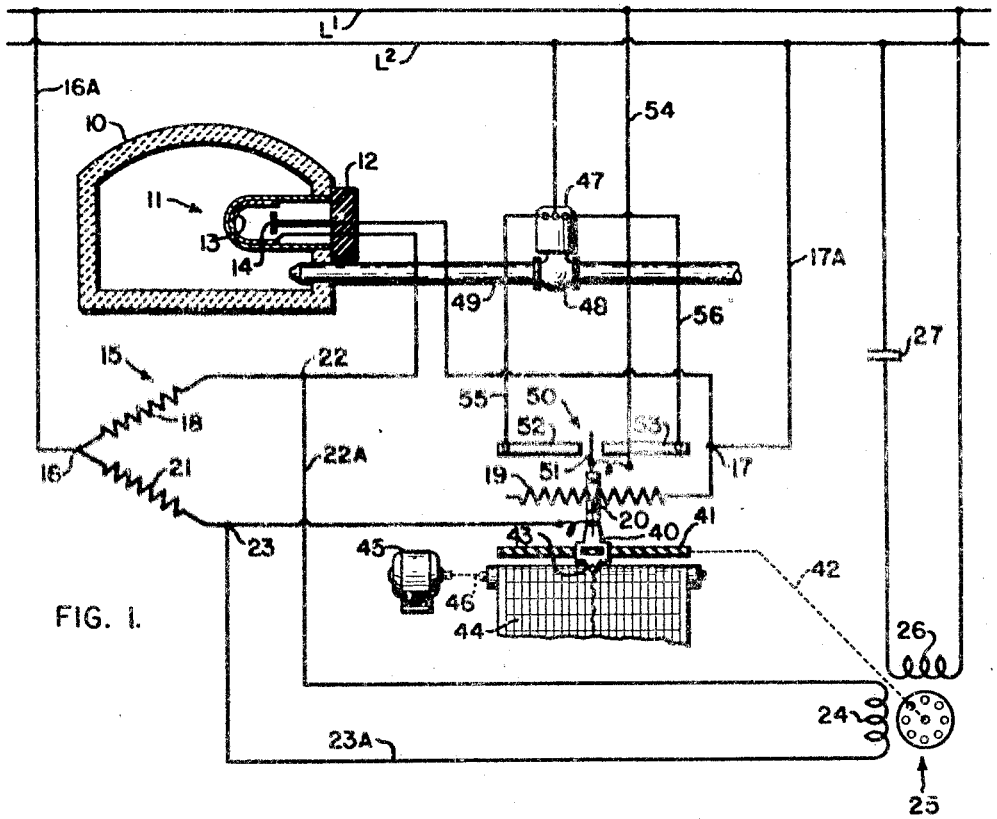
FIG. 1.
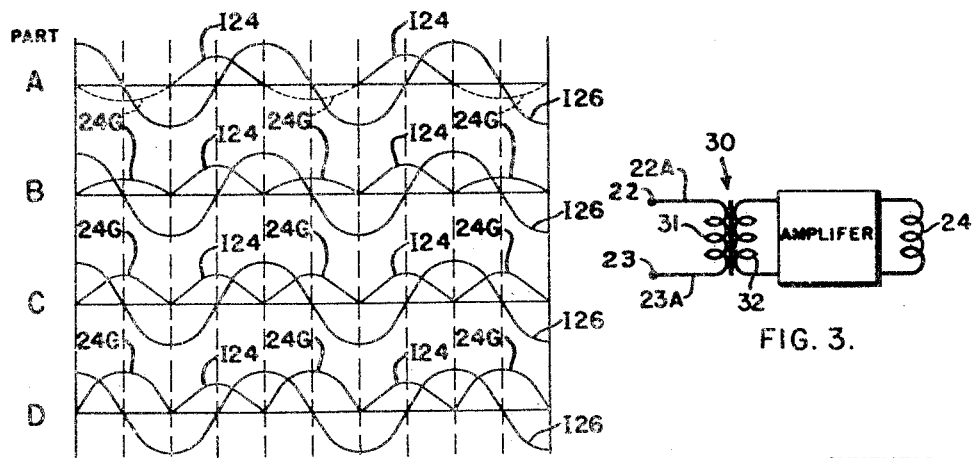
FIG. 2.
FIG. 3.
*INVENTOR.*
FREDERICK W. SIDE
BY
*C B Spangenberg*
ATTORNEY.

INVENTOR.
FREDERICK W. SIDE
BY *G. B. Spangenberg*
ATTORNEY.

Patented Mar. 25, 1947

2,418,052

UNITED STATES PATENT OFFICE 2,418,052

MEASURING AND CONTROLLING APPARATUS

Frederick W. Side, Philadelphia, Pa., assignor to The Brown Instrument Company, Philadelphia, Pa., a corporation of Pennsylvania Application October 8, 1942, Serial No. 461,268

4 Claims. (Cl. 172—239)

The present invention relates to improvements in automatic recording and controlling systems and apparatus therefor.

It is an object of the invention to provide a temperature measuring and/or controlling system which is characterized by its compactness, simplicity, and effectiveness, and which may be operated from a commercial source of alternating current supply.

Another object of the invention is to provide a measuring and controlling system which makes possible the use of very sensitive electronic temperature responsive devices in the measuring and/or controlling of thermal conditions.

It is another object of the invention to utilize the changes in the conductivity of an electronic temperature responsive device, which occur upon changes of a thermal condition to which it is subjected, to electrically control the operation of a reversible electric motor.

One of the factors controlling the emission current and hence the conductivity of an electronic discharge device is the temperature of its cathode surface. The operation of electronic temperature responsive devices which depends upon this characteristic is, by the present invention, made useful for the simplification of measuring and controlling equipment for certain applications.

In accordance with this invention an electronic temperature responsive device, to be described, is provided, and the changes in conductivity, which occur in said device upon changes in a thermal condition to which it is made responsive, are used to selectively control the rotation and direction of rotation of an electrical reversible motor. The driving force obtained from a motor controlled in this way may then be used, in turn, to operate indicating, recording and/or controlling equipment.

There are certain instances wherein it is more desirable for the purposes of measurement and/or control to use an electronic temperature responsive device in preference to temperature responsive devices such as thermoelectric couples, resistance thermometer bulbs, or thermostats. These latter devices are often lacking in sensitivity, or their output of controlling energy is so small that they cannot be used without slow moving mechanical relays or other provisions for obtaining a high degree of amplification. In addition the controlling energy of certain of these prior art temperature responsive devices is not readily magnified by direct electrical amplification. For example, in practice, before the continuous direct current derived from a thermoelectric couple can be amplified, it must be first translated into a pulsating current, which operation requires the use of additional apparatus. These disadvantages of the prior art arrangements are obviated by means of the present invention wherein pulsating currents, which are easily amplified, may be directly derived from an electronic temperature responsive device. In addition, in certain embodiments of the present invention a pulsating current of sufficient magnitude may be obtained from an electronic temperature responsive device which will wholly eliminate the necessity of amplification.

The various features of novelty which characterize this invention are pointed out with particularity in the claims annexed to and forming a part of this specification. For a better understanding of the invention, however, its advantages and the specific objects obtained with its use, reference should be had to the accompanying drawings and descriptive matter in which are illustrated and described preferred embodiments of the invention.

Of the drawings:

Fig. 1 is a diagrammatic illustration showing the present invention applied to measuring and controlling the temperature of a furnace;

Fig. 2 is a graphic representation of the time relation and magnitude of current impulses flowing in a portion of the circuit of Fig. 1;

Fig. 3 is a modification of a portion of Fig. 1;

Figure 4:
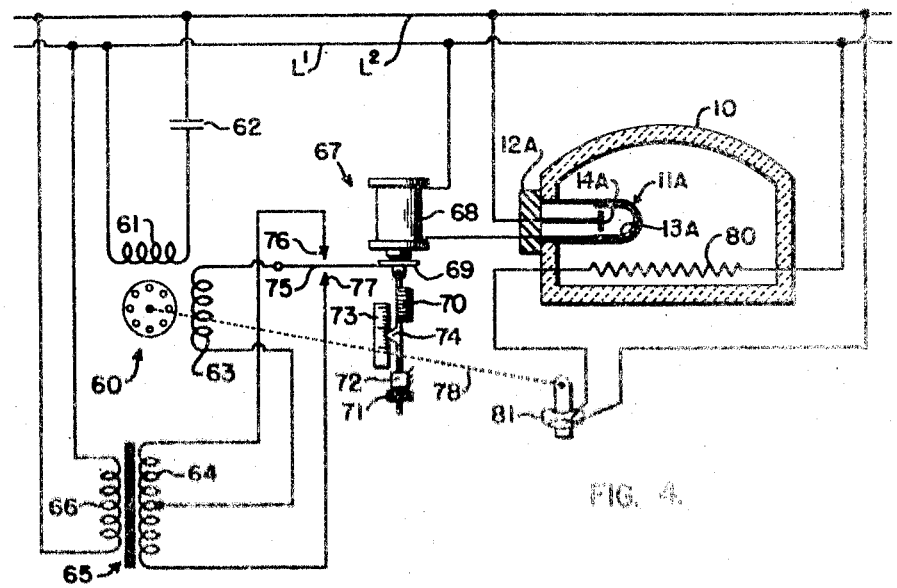
Figure 5:
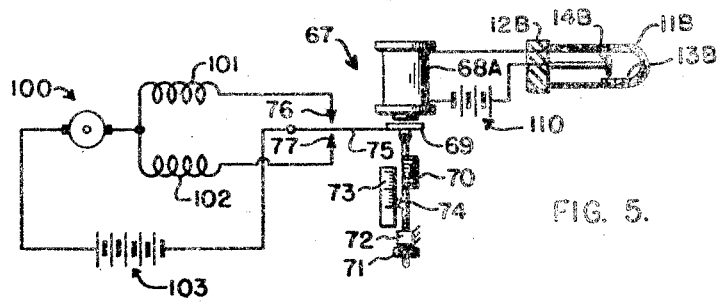

Fig. 4 diagrammatically illustrates a modified form of the invention;

Fig. 5 illustrates a modification of Fig. 4; and

Figure 6:
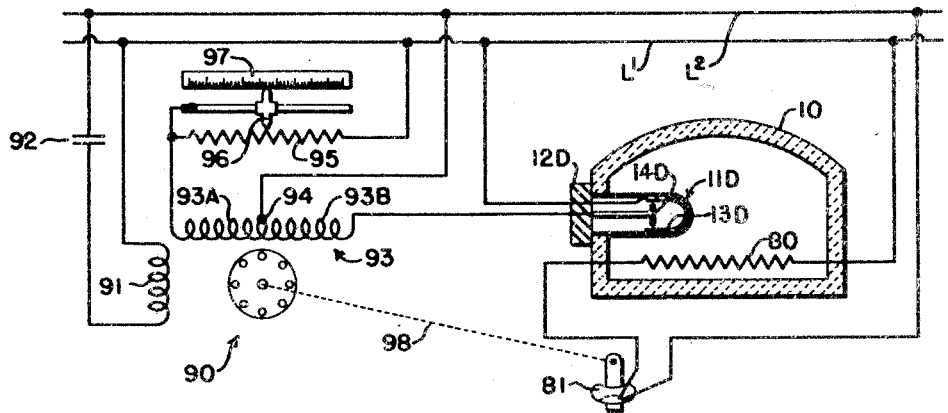

Fig. 6 diagrammatically illustrates another modification of the invention.

Fig. 1 of the drawings illustrates a temperature recording and controlling system operating in accordance with this invention. An electronic thermal responsive device 11 is positioned to respond to the temperature within a furnace 10, and by means of the apparatus shown the temperature of said furnace is both recorded and controlled. In this illustration the electronic temperature responsive device 11 constitutes one branch of an alternating current Wheatstone bridge network 15 of the automatic self stabilizing variety. The bridge network of this invention is never actually balanced but is operated at a simulated or effective balance point. While the bridge network is never precisely balanced, however, the operation thereof at the simulated or effective balance point is, for all practical purposes, the same as if it were adapted to be exactly balanced.

For every value of the cathode temperature of the electronic temperature responsive device 11 the device will have a definite emission current influencing its conductance and hence the fall of potential thereacross. For each value of the conductance of the electronic temperature responsive device there will be a value of resistance which, if included in the balancing arm of the bridge network, will permit an unbalanced current to flow between the bridge potential points in one direction when the electronic device is conductive and will allow the flow of a current of the same magnitude in the same direction between the bridge potential points when the electronic device is non-conductive. This resistance value determines the simulated or effective balance point of the bridge and the currents which may be obtained from the bridge potential points upon deviation from this simulated balance point may be used to selectively control the operation of a reversible electric motor 25.

By introducing the proper circuit constants the current pulses flowing between the bridge potential points may alternately be made to be in phase and 180° out of phase with the alternating current supply voltage. The two-phase reversible electric motor 25 may have one phase winding continually supplied from the same alternating current source used to energize the bridge network. A condenser inserted in series with this winding and the supply source may serve to shift the current in this winding approximately 90° with respect to the supply line voltage. By supplying a second phase winding of the two-phase reversible electric motor from the bridge potential points the motor will tend to be energized for rotation in one direction on the positive half cycles of the alternating current supply source and will tend to be energized for rotation in the opposite direction on the negative half cycles of the alternating current supply source. When the bridge is at the simulated balance point the second phase winding of the motor is energized equally on the alternate half cycles and consequently the motor is alternately energized for rotation in opposite directions with equal force. The inertia of the armature of the motor, however, effectively prevents rotation of the motor in either direction due to the rapidity of the current changes.

Changes in the temperature of the cathode of the electronic temperature responsive device will change the conductance of the device thus destroying the equality of the currents flowing between the bridge potential points on the alternate half cycles. The consequent preponderance of either current will result in the motor being energized more strongly to turn in one direction than the other on either the positive or the negative half cycles of the alternating current supply source. The speed and direction of rotation of the motor being dependent upon the degree of the preponderating pulses of current will therefore depend on the extent of deviation of the bridge from its simulated balance and thereby on the amount and direction of change of the cathode temperature of the electronic temperature responsive device. A mechanical connection between the motor and the balancing resistance may be used to adjust the resistance toward a value which will restore the simulated balanced condition, thus deenergizing the motor for rotation.

Referring more specifically to Fig. 1 of the drawings the reference numeral 10 indicates a furnace whose temperature it is desired to both measure and control. The reference numeral 11 designates an electronic temperature responsive device positioned to respond to the temperature in the furnace 10. This device 11 may be of any one of several varieties. For purposes of illustration the device 11 herein is shown as having a casing which may be metallic, ceramic or any other suitable substance sealed to a base member 12 of suitable insulating material. A cathode 13 and an anode 14 are disposed within said casing and the casing may be evacuated or filled with an inert gas. The cathode material may comprise thoriated tungsten or any of many materials the suitability of which depends upon the range of temperature to which the device is to be subjected. In the illustration the cathode material is shown deposited directly upon the inner surface of the casing of the temperature responsive device. Such a construction as shown has the advantage of placing the cathode material in intimate contact with the temperature condition to which it is to respond. If desired, however, the cathode 13 may be a separate element within the tube.

The electronic temperature responsive device 11 shown positioned to respond to the temperature within the furnace 10, is connected to form an arm of a Wheatstone bridge circuit 15. In series with the device 11 between bridge supply junctions 16 and 17 is a fixed resistance 18 of some suitable value. The other branch of the bridge network 15 contains an adjustable bridge balancing resistance 19 the effective value of which is controlled by the movement of a contact 20 therealong. In series with the adjustable resistance 19 between bridge supply junctions 16 and 17 is a fixed resistance 21 of some suitable value. Intermediate the electronic temperature responsive device 11 and fixed resistance 18, and adjustable resistance 19 and fixed resistance 21 are the bridge potential points 22 and 23.

One field winding 24 of a two-phase reversible electric motor 25 may be connected directly across the bridge potential points 22 and 23. By supplying the bridge circuit 15 with current from the alternating current supply conductors $L^1$ and $L^2$ and by introducing the proper circuit constants the motor phase winding 24 will be energized with bridge unbalance currents from the bridge potential points which alternately are in phase with and 180° out of phase with the supply line voltage. The magnitude of each phase component of these currents is dependent upon the extent of the bridge unbalance during each half cycle.

A second field winding 26 of the motor 25 may be connected in series with a condenser 27 across the alternating supply line comprising conductors $L^1$ and $L^2$. As will be understood by those skilled in the art the action of the condenser 27 in series with the second motor field winding 26 may serve to displace the current through this winding approximately 90° with respect to the supply line voltage. Since the first motor field winding 24 is energized alternately, with current in phase with or 180° out of phase with the supply line voltage, the currents in the two motor phase windings are displaced in phase approximately 90°. With the phase relationships existing as described the motor 25 will be energized for rotation if either phase component of the currents in the winding 24 is preponderant. The direction of rotation of the motor 25 will depend upon which of these components is the greater. A clearer understanding of the motor operation may be had by studying the action which takes place during each half cycle of the alternating current for various degrees of conductivity of the electronic temperature responsive device 11 when the value of the balancing resistance 19 remains constant.

On that half cycle when the anode 14 of the temperature responsive device 11 is negative the device 11 will be relatively non-conducting so that the device 11 constitutes an impedance or resistance of theoretically infinite value. When this condition exists current will flow from supply line $L^1$ through conductor 16A to the bridge supply junction 16. The current will divide at junction 16 so that a portion flows through resistance 18 to bridge potential junction 22 and since the device 11 is not conducting this current will flow from junction 22 through conductor 22A through motor phase winding 24, and conductor 23A to bridge junction 23. This path is in effect in parallel with the resistors 18 and 21 and the parallel combination is in series with the adjustable resistance 19 so that the total current will flow through the included portion of the balancing resistance 19 to bridge supply junction 17 and through conductor 17A to line $L^2$. As may be noted the value of the current which flows upon this half cycle is controlled by the conductivity of the included portion of resistance 19. On the alternate half cycle when the anode of device 11 is positive and the device is conducting, current will flow from supply line $L^2$ through conductor 17A to bridge junction 17 where it will divide, a portion of the current flowing through each of the bridge paths. If the potential drop through the temperature responsive device 11 is the same as the potential drop through the included portion of balancing resistor 19 no difference of potential will be created at the bridge potential points 22 and 23 and no current will be supplied to the motor phase winding 24. The currents which do flow will proceed through their respective branches to the bridge supply junction 16 through conductor 16A to line $L^1$. In order for current to flow through the bridge path from the junction 22 to junction 23 of a magnitude equal to that which flowed through the bridge path on the previous half cycle, the potential drop across the device 11 must be materially less than that across the included portion of the balancing resistor 19 since, as has just been explained, no current will flow in the bridge path when the two potential drops are equal.

In Fig. 2 of the drawings the currents which may be caused to flow in the field windings of the two-phase motor 25 are graphically reproduced for various relationships between the effective conductivity of the device 11 and the conductivity of the effective portion of the bridge balancing resistor 19. In part A of Fig. 2 the alternating current flowing through the winding 26 of the motor 25 is illustrated by the curve I26. In this same part the curve I24 represents the value and phase displacement of current through the field winding 24 of the motor 25 which flows through the winding 24 on that half cycle during which the electronic temperature responsive device is non-conductive, providing the value of the effective portion of resistance 19 remains constant. On that half cycle during which the device 11 is conductive, and the bridge potential points 22, 23 are at the same value, no current will flow in the winding 24.

Part B of Fig. 2 again shows the current I26 which flows continuously in the winding 26. Curve I24 serves to designate the current which flows through winding 24 on that half cycle during which the device 11 is non-conductive. The curve 24G serves to designate a value of current which may flow through the winding 24 on the alternate half cycle when the device 11 is conductive, and the conductance of device 11 is such that the potential drop across it is less than the drop across the effective portion of resistance 19 but not sufficiently less to permit a current flow as large as current I24. The current flow is again from bridge junction 22 to bridge junction 23 since junction 22 is at a higher potential.

In part C of Fig. 2 the simulated balance point is illustrated. The curve I26 is representative of the current which continuously flows in the winding 26. The curve I24 illustrates that current which flows through the winding 24 on the half cycle when the device 11 is non-conductive. The curve 24G illustrates the current which flows through the winding 24 in the same direction on the alternating half cycle when the device 11 is conducting and has a potential drop sufficiently less than that across the effective portion of resistance 19 so as to cause the current 24G to be equal to the current I24.

In part D of Fig. 2 the current I26 is again representative of the current flowing continuously through the winding 26 of the motor 25. The current I24 is again illustrative of the current which flows through the winding 24 on the half cycle during which the device 11 is non-conductive. The current 24G as may be noted is substantially greater than the current I24 and is illustrative of the current which will flow through the winding 24 on the half cycle when the device 11 is conducting and the potential drop of the device 11 is even less than that drop which will allow a current 24G to flow which is equal to the current I24.

By inspection of the curves of Fig. 2, especially part C, it may be noted the curves show that when the currents I24 and 24G are equal they will in effect cancel each other as far as producing a net rotation of the motor 25 is concerned, due to the inertia of the armature and the rapidity of the current change. In other words, the motor 25 is momentarily urged to rotate in one direction and on the alternating half cycle is urged to an equal extent to turn in the opposite direction due to the equal current pulses, which are 180° out of phase, flowing in the winding 24 on the alternate half cycles. An inspection of part B of Fig. 2 discloses the fact that although the potential drop across the device 11 is less than that across the effective portion of the balancing resistance 19 on the half cycle when the device 11 is conducting, the predominant current I24 which leads I26 by 90° will energize the motor 25 for rotation in one direction. An inspection of part D shows the curve 24G greater than the curve I24. This results when the potential drop across the device 11, on the half cycle when the device 11 is conducting, is at a value still less than that which exists when the condition of simulated balance is achieved. In this instance the motor will be urged to rotate in a direction opposite to that resulting from the currents illustrated in part B because in this case the pulsating current which lags the current I26 by 90° is predominant.

From the foregoing explanation it may be noted that at the point wherein the condition of simulated balance exists the potential drop across the device 11 is of necessity materially less than the drop across the effective portion of the bridge balancing resistor 19 on the half cycle when the device 11 is conductive. At such times when the potential drop across the device 11 increases beyond the value which will actually balance the bridge on the half cycle when the device 11 is conducting, the direction of bridge unbalance will be reversed and the direction of current 24G flowing through the winding 24 on the half cycle when the device 11 is conductive will be as shown by the dotted curve 24G in part A of Fig. 2. The effect of this reversal of current to winding 24 is to assist the current I24 then energizing the motor for rotation in one direction.

The detailed description given of the currents which would flow in the bridge path of network 15 for various relationships between the potential drops of the effective portion of adjustable resistance 19 and device 11 make it possible to clearly understand how motor 25 may be selectively energized for rotation in opposite directions in response to changes of temperature from a predetermined value. It is apparent that the conductivity of device 11 is a function of the temperature of the furnace 10 and that for some particular temperature of furnace 10 some definite potential drop across the device 11 will result. By adjusting the resistance 19, the proper difference in the potential drops across the device 11 and the effective portion of resistance 19 for simulated balance may be initially adjusted whereby no net rotation of the motor 25 will be brought about as long as the relationship between the potential drops does not change. Upon an increase in the temperature of the furnace 10 from the above value, the conductivity of device 11 will increase which, as has been described, will cause a net rotating field to be set up in motor 25 which will result in rotation of the motor. If, however, the temperature of the furnace 10 decreases, the conductivity of device 11 will decrease which results in a net rotating field being established to cause rotation of the motor in the opposite direction.

With the conductivity of device 11 dependent upon the temperature of its cathode 13 which, in turn, depends upon the temperature of the furnace 10, the position of the contact 20 along adjustable resistance 19 which will produce the required differential in the potential drops across the effective portion of resistance 19 and the device 11 will be definitely related to the furnace temperature. By relating a properly calibrated scale and pointer to the position of contact 20 along the resistance 19 the temperature of the furnace 10 will be indicated when the state of simulated balance exists. If the temperature of the furnace 10 increases above or falls below a value at which the Wheatstone bridge network 15 is in a state of simulated balance, the reversible motor 25 will be selectively energized to rotate in one direction or the other and by providing a suitable mechanical connection between the motor 25 and the contact 20 the driving force of the motor 25 may be utilized to restore the condition of simulated balance. The driving force of the motor may be used to move contact 20 to increase the effective portion of resistance 19 upon a decrease in temperature and to decrease the effective portion of resistance 21 upon an increase in temperature of the furnace 10 which will tend to restore the desired differential condition of the potential drops across the device 11 and the effective portion of resistance 19.

As is also illustrated in Fig. 1 of the drawings the contact 20 may be supported for engagement along resistance 19 by a carriage member 40. The carriage member 40 may be in threaded engagement with a screw shaft 41 and is supported (by means not shown) for movement parallel to the resistance 19. A suitable mechanical connection indicated by dotted line 42 may be provided so that rotation of the motor 25 will turn screw shaft 41 which will linearly adjust the position of carriage 40 and hence move the contact 20 along resistance 19 in either direction.

If desired, a pen 43 may be mounted on the carriage 40 which carries the contact 20 of the adjustable resistance 19, and arranged in cooperative relation with a recorder chart 44 to thereby provide a continuous record of the temperature of the interior of the furnace 10. The chart 44 may be a strip chart as shown which may be driven in any convenient manner as, for example, by a unidirectional motor 45 through suitable gearing indicated at 46 so that the record of the temperature to which device 11 is subjected will be recorded as a continuous line on the chart. It will be apparent that the resistance 19 may be mounted on a circular form and that a circular chart may be employed for recording purposes in lieu of the strip chart 44, if desired.

The supply of heating agent to the furnace 10 may be controlled in accordance with the deflections of the recording pen 43 along the chart 44. For example, a reversible electrical motor 47 having two opposed field windings (not shown) may be utilized to adjust a fuel valve 48 disposed in a pipe 49 which supplies fuel to the furnace 10. To this end the reversible motor 47 is energized for rotation in one direction or the other depending upon the direction of deflection of the pen 43 from a predetermined position along the chart 44, which position corresponds to the temperature it is desired to maintain within the furnace 10.

Specifically, a switch 50 which is actuated in accordance with the adjustments of the recording pin is provided for controlling the energization of the motor 47. The switch 50 comprises a switch arm 51 which is insulated from but is carried by the same carriage 40 which carries the pen and the contact 20. Two elongated contact segments 52 and 53 are disposed on opposite sides of the arm 51. The arm 51 is connected by a conductor 54 to the alternating current supply conductor L¹. The contact segment 52 is connected by a conductor 55 in which one winding of the motor 47 is inserted to the alternating supply conductor L², and the contact segment 53 is connected by a conductor 56 in which the other winding of the motor 47 is inserted to the supply conductor L².

With the arrangement described, when the arm 51 is intermediate the contact segments 52 and 53, the motor 47 is not energized for rotation in either direction, but when the arm is in engagement with the contact segment 52 the motor 47 is energized for rotation in the direction to open the fuel valve 48 and thereby to increase the supply of fuel to the furnace 10. When the arm 51 is in engagement with the contact segment 53, the motor 47 is energized for rotation in the opposite direction and effects a closing adjustment of the valve 48 and thereby a decrease in the supply of fuel to the furnace.

Although not shown, the contact segments 52 and 53 of the switch 50 are desirably made adjustable relative to each other and to the chart 44 so that both the sensitivity and the control point setting of the apparatus may be adjusted in a manner well known in the art.

Fig. 3 illustrates, more or less diagrammatically, a modification of the arrangement of Fig. 1 wherein the unbalanced currents derived from the bridge network are first amplified by a suitable electronic amplifier and then applied to the motor winding 24. In Fig. 3 a transformer 30 is shown interposed between the bridge potential points 22 and 23 and the amplifier. The primary winding 31 may be connected across the bridge potential points 22 and 23 and the pulsating current in the primary winding 31 is transformed into an alternating current in the secondary winding 32. Using a transformer coupling between the amplifier and the bridge 15 makes it possible to provide the motor winding 24 with alternating current either leading or lagging in phase with respect to the alternating current in motor winding 26 depending on the direction of deviation from the bridge simulated balance point as distinguished from supplying the motor winding 24 with pulsating unidirectional currents as in the Fig. 1 arrangement. Since basically the principles of operation are the same and those skilled in the art will understand the operation of this modification, no further explanation is deemed necessary.

In Fig. 4 of the drawings, a different arrangement for controlling a two-phase reversible motor in response to changes in the conductivity of an electronic temperature responsive device is diagrammatically illustrated. A two-phase motor 60 is shown having one field winding 61 with a condenser 62 in series therewith connected directly across an ordinary commercial A. C. supply source comprising lines L¹ and L². A second field winding 63 is adapted to be connected across one half or the other of the secondary winding 64 of a phase shifting transformer 65 by means of a double throw, single pole relay 67. The relay device 67 may be controlled in its operation by the emission current of the electronic temperature responsive device 11A which is shown suitably related to be affected by the temperature of the furnace 10. A coil 68 of relay 67 may be connected in series with the device 11A and the series combination supplied with current from the lines L¹ and L². The armature 69 of relay 67 is shown adjustably biased toward one position by means of a spring 70 the tension on which is changeable in accordance with the adjustment of a nut 71 which is in threaded engagement with an extended portion of the spring. The nut 71 is shown abutting a block 72 which is rigidly mounted in some suitable manner and has a hole therein through which the extended portion of the spring may freely pass. A scale 73 may be properly related to the path traveled by the extended portion of spring 70 so that a pointer 74 formed by a part of the spring extension may be used to indicate the value of the pulling force on the spring 70. Since the emission current of device 11A is a function of temperature and the average pulling force of the relay coil 68 is dependent upon the current flowing through it, this force may be calibrated in units of temperature. The scale indicating the pull of the spring necessary to balance the pull of the relay coil 68 on armature 69 when calibrated in terms of temperature may therefore, serve as a control point setting.

As may be noted the relay armature 69 actuates a switch arm 75. The relay is provided with two contacts 76 and 77 so that either or neither of two different circuits may be closed. Contact 76 is connected to one end of the secondary coil 64 of transformer 65 and contact 77 is connected to the other end of coil 64. The switch arm 75 is shown connected to one end of the field winding 63 of motor 60 while the other end of winding 63 is shown connected to the center tap of secondary coil 64. The primary coil 66 of transformer 65 is connected directly across the supply lines L¹ and L² and it is obvious therefore that current may be caused to flow in winding 63 which is approximately in phase or 180° out of phase with the line current depending upon whether switch arm 75 engages contact 76 or 77.

In the operation of this arrangement the nut 71 may be adjusted to bring the pointer to a temperature which it is desired to maintain in the furnace 10. If the furnace is below the desired temperature the pull of the spring 70 being greater than that of the relay coil 68 will cause switch arm 75 to engage contact 77 thus energizing the motor 60 for rotation in one direction. If the furnace is above the control point temperature the current flowing through relay coil 68 will energize the relay sufficiently to overcome the spring bias of the armature and switch arm 75 will engage contact 76 and the motor 60 will be energized for rotation in the opposite direction. If the temperature of the furnace 10 is at the set value the pull of the spring 70 and the pull of the relay coil 68 on armature 69 will balance each other and neither contact will be engaged.

The motor 60 may be mechanically connected by suitable means indicated by dotted line 78 to operate means for controlling the temperature within the furnace. In the illustration provided, the furnace 10 is shown heated by a heating element 80 which is connected with a mercury switch 81 in series therewith directly across the supply lines L¹ and L². When the temperature of the furnace is below the control point setting, the motor will be energized and by means of connection 78, may move switch 81 to its closed position to supply heat. If the furnace temperature rises above the control point setting, the motor will be energized for rotation in the opposite direction and will move the switch 81 to its open position thus cutting off the supply of heat. The motor may have limit switches (not shown) which will operate to deenergize the motor when the switch 81 reaches its extreme positions.

In Fig. 5 is illustrated a modification of Fig. 4 wherein the relay device of Fig. 4 may be incorporated for use with either a D. C. or an A. C. source of supply and a reversible series, commutator type motor. For the purposes of illustration, the relay 67 has its coil 68A connected in series with the electronic temperature responsive device 11B and the circuit is supplied with current from a battery 110. Changes in the conductivity of the device 11B will, as in the case illustrated in Fig. 4, govern the amount of pull exerted by the relay coil 68A. The relay will operate in one direction or the other depending upon the forces acting on the armature 69 as described in Fig. 4. The relay contacts 76 and 77 may be connected to separate fields 101 and 102 of a single phase reversible motor 100. The motor 100 illustrated is a split field D. C. motor so connected that its armature and one or the other of fields 101 and 102 will be connected in series therewith.

Fig. 6 of the drawings illustrates still another method of supplying a rotating field motor, of somewhat different construction, with currents properly shifted in phase in accordance with the changes of a thermal condition from a desired value. In this figure, the electronic temperature responsive device 11D is illustrated as being suitably related to a condition of temperature to be controlled. As in Fig. 4, the furnace 10 is shown supplied with heat by a heating coil 80 which is connected directly across the lines $L^1$ and $L^2$. A mercury switch 81 controlled in its operation by a reversible rotating field motor 90 is adapted to connect or disconnect the heating coil 80 from the A. C. supply source, depending on whether the furnace is below or above a desired temperature. If desired a rheostat may be used in lieu of the switch 81. The motor 90 has one of its field windings 91 connected directly across the A. C. supply lines $L^1$ and $L^2$. A condenser 92 is connected in series with this field winding so as to shift the phase of the current therein for the proper operation of such motors. The field winding 93 of the motor 90 has a center tap 94 and the two halves of the field winding thus formed are each connected across the A. C. supply lines $L^1$ and $L^2$ as shown. In series with one half of the field winding 93A is an adjustable resistance 95 having a movable contact 96 for controlling the effective value of the resistance. In series with the other half of motor field winding 93B is the electronic temperature responsive device 11D.

By inspection it may easily be noted that the elements just mentioned form a parallel circuit combination connected directly across the A. C. supply lines $L^1$ and $L^2$. The half of the field winding, 93A, will therefore always receive current of a value dependent upon the position of contact 96 along resistance 95 and this current will be approximately in phase with the line current. The other half of the field winding 93B will only receive current on the half cycle when the electronic temperature responsive device is conductive and the amount of this current will depend upon the conductivity of device 11D which, in turn, is dependent upon the temperature of the furnace 10. The motor 90 is so constructed that when both of the windings 93A and 93B are energized to the same extent the motor is not actuated for rotation in either direction, but when one of the windings 93A or 93B is energized to an extent greater than that to which the other is energized, the motor is actuated for rotation in a corresponding direction. In Fig. 6 the winding 93A is continuously energized and the field winding 93B is periodically energized but for every value of the current flow through the winding 93A which is continually energized there is some value of the periodic current flow through winding 93B at which the average values of the currents tending to energize the motor for rotation in reverse directions will in effect neutralize each other. If the temperature of the furnace 10 rises above the desired value, the emission current of device 11D will increase so that the pulses of current energizing the winding 93B will no longer be neutralized by those in the winding 93A. Consequently, a resultant magnetic field will be established in the motor 90 by the windings 93A and 93B which is displaced approximately 90° in phase with the field set up by the winding 91. These two magnetic fields will react with each other to effect actuation of the motor 90 for rotation in one direction. If the emission current in device 11D decreases due to a falling temperature condition of the furnace 10, the average current flowing in the field winding 93A will predominate over that in winding 93B to produce a resultant field in the motor 90 which is displaced approximately 90° in the opposite direction from the field set up by winding 91. The motor 90 will then be urged to rotate in the opposite direction.

A control point setting for the furnace may be provided by supplying a scale 97 along resistance 95 suitably calibrated in terms of temperature and which will properly indicate the position to which contact 96 should be set in order that the average currents flowing in each half of the motor windings 93A and 93B will neutralize each other when the furnace is at a desired temperature. The motor 90 may be suitably connected, as indicated by dotted line 98, to operate the mercury switch 81 so that the switch will be opened when the furnace temperature rises above the control point value and the switch will be closed when the furnace temperature falls below the control point.

While in accordance with the provisions of the statutes, I have illustrated and described the best forms of embodiment of my invention now known to me, it will be apparent to those skilled in the art that changes may be made in said forms of embodiment without departing from the spirit of my invention as set forth in the appended claims, and that certain features of my invention may be used with advantage in some cases, without a corresponding use of other features.

Having now described my invention, what I claim as new and desire to secure by Letters Patent is as follows:

1. In apparatus for measuring the magnitude of a variable condition, an electronic discharge rectifier device having a plurality of elements including a cathode the temperature of which is a function of a condition to be measured, an adjustable resistance, a normally unbalanced Wheatstone bridge network including resistances in two opposite arms, said adjustable resistance in a third arm and said electronic discharge rectifier device in a fourth arm, said bridge network having a pair of energizing terminals and having a pair of output terminals, an electrical rotating field motor having a pair of field windings, means connecting one of said motor field windings to the output terminals of said bridge network, means connecting the other of said motor field windings and the energizing terminals of said bridge network to a source of alternating voltage of predetermined frequency whereby alternating current of said predetermined frequency flows through said other motor field winding and whereby pulses of current of predetermined magnitude, dependent upon the adjustment of said adjustable resistance, flow in one direction between said output terminals and through said one motor field winding during the half cycles of said alternating voltage when said electronic discharge rectifier device is non-conductive and pulses of current of variable magnitude depending upon the effective resistance of said electronic discharge rectifier device flow in the same direction between said output terminals and through said one motor field winding during the other half cycles of said alternating voltage, the current pulses during both half cycles having substantially the same amplitude when the effective resistance of said electronic discharge rectifier device is equal to the resistance of said adjustable resistance in consequence of which said motor is energized for operation in first one direction and then the other at the frequency of said alternating voltage and remains stationary, the current pulses during said other half cycles being greater than or less than the current pulses flowing during said first mentioned half cycles accordingly as the effective resistance of said electronic discharge rectifier device is respectively greater or less than the resistance of said adjustable resistance in consequence of which said motor is actuated for rotation in a corresponding direction, and means under the control of said motor to adjust the value of said adjustable resistance as required to maintain the value thereof substantially equal to the effective resistance of said electronic discharge rectifier device.

2. In apparatus for measuring the magnitude of a variable condition, an electronic discharge rectifier device having a plurality of elements including a cathode the temperature of which is a function of a condition to be measured, an adjustable resistance, a normally unbalanced Wheatstone bridge network including resistances in two opposite arms, said adjustable resistance in a third arm and said electronic discharge rectifier device in a fourth arm, said bridge network having a pair of energizing terminals and having a pair of output terminals, an electrical rotating field motor having a pair of field windings, electronic amplifying means having an input circuit connected to the output terminals of said bridge network and having an output circuit connected to one of said motor field windings, means connecting the other of said motor field windings and the energizing terminals of said bridge network to a source of alternating voltage of predetermined frequency whereby alternating current of said predetermined frequency flows through said other motor field winding and whereby pulses of current of predetermined magnitude, dependent upon the adjustment of said adjustable resistance, flow in one direction between said output terminals and through the input circuit of said electronic amplifying means during the half cycles of said alternating voltage when said electronic discharge rectifier device is nonconductive and pulses of current of variable magnitude depending upon the effective resistance of said electronic discharge rectifier device flow in the same direction between said output terminals and through the input circuit of said electronic amplifying means during the other half cycles of said alternating voltage, the current pulses during both half cycles having substantially the same amplitude when the effective resistance of said electronic discharge rectifier device is equal to the resistance of said adjustable resistance in consequence of which the amplified current in the output circuit of said electronic amplifying means energizes said one motor field winding for operation of the motor in first one direction and then the other at the frequency of said alternating voltage so that said motor remains stationary, the current pulses during said other half cycles being greater than or less than the current pulses flowing during said first mentioned half cycles accordingly as the effective resistance of said electronic discharge rectifier device is respectively greater or less than the resistance of said adjustable resistance in consequence of which said one motor field winding is energized for operation of the motor in a corresponding direction, and means under the control of said motor to adjust the value of said adjustable resistance as required to maintain the value thereof substantially equal to the effective resistance of said electronic discharge rectifier device.

3. In apparatus for measuring the magnitude of a variable condition, an electronic discharge rectifier device having a plurality of elements including a cathode the temperature of which is a function of a condition to be measured, an adjustable resistance, a normally unbalanced Wheatstone bridge network including resistances in two opposite arms, said adjustable resistance in a third arm and said electronic discharge rectifier device in a fourth arm, said bridge network having a pair of energizing terminals and having a pair of output terminals, means connecting said energizing terminals to a source of alternating voltage of predetermined frequency whereby there is derived from said bridge network output terminals a unidirectional voltage pulsating at a frequency double the frequency of the alternating voltage applied to said energizing terminals, the amplitudes of the pulsations of said voltage being substantially the same when the effective resistance of said electronic discharge rectifier device is the same as the resistance of said adjustable resistance, the amplitude of the pulsations of said voltage varying during one half cycle of the alternating voltage applied to said energizing terminals in accordance with the variations in the effective resistance of said electronic discharge rectifier device in consequence of which the pulsating voltage between said output terminals is made to include a component having said predetermined frequency when the effective resistance of said electronic discharge rectifier device is different from the resistance of said adjustable resistance, and means connected to said bridge network output terminals and unresponsive to voltages of said double frequency but operative in response to the presence of a pulsating voltage having said predetermined frequency to adjust said adjustable resistance as required to maintain the value thereof substantially equal to the effective resistance of said electronic discharge rectifier device.

4. In apparatus for measuring the magnitude of a variable condition, an electronic discharge rectifier device having a plurality of elements including a cathode the temperature of which is a function of a condition to be measured, an adjustable resistance, a normally unstabilized network including said adjustable resistance in one branch and said electronic discharge rectifier device in a second branch, an electrical rotating field motor having a pair of field windings one of which is connected in circuit with said network, said network having a pair of energizing terminals, means connecting the other of said motor field windings and the energizing terminals of said network to a source of alternating voltage of predetermined frequency whereby alternating current of said predetermined frequency flows through said other field winding and whereby pulses of current of predetermined magnitude dependent upon the adjustment of said adjustable resistance flow in one direction through said one motor field winding during the half cycles of said alternating voltage when said electronic discharge rectifier device is non-conductive and pulses of current of variable magnitude depending upon the effective resistance of said electronic discharge rectifier device flow in the same direction through said one motor field winding during the other half cycles of said alternating voltage, the current pulses during both half cycles having substantially the same amplitude when the effective resistance of said electronic discharge rectifier device is equal to the resistance of said adjustable resistance in consequence of which said motor is energized for operation in first one direction and then the other at the frequency of said alternating voltage and remains stationary, the current pulses during said other half cycles being greater than or less than the current pulses flowing during the first mentioned half cycles accordingly as the effective resistance of said electronic discharge rectifier device is respectively greater or less than the resistance of said adjustable resistance in consequence of which said motor is actuated for rotation in a corresponding direction, and means under control of said motor to adjust the value of said adjustable resistance as required to maintain the value thereof substantially equal to the effective resistance of said electronic discharge rectifier device.

FREDERICK W. SIDE.

REFERENCES CITED

The following references are of record in the file of this patent:

UNITED STATES PATENTS

| Number | Name | Date |
|---|---|---|
| 2,245,034 | Harrison | June 10, 1941 |
| 1,994,904 | Wilson | Mar. 19, 1935 |
| 2,275,317 | Ryder | Mar. 3, 1942 |
| 2,300,742 | Harrison et al. | Nov. 3, 1942 |
| 2,312,711 | Harrison | Mar. 2, 1943 |
| 2,112,682 | Ryder | Mar. 29, 1938 |
| 1,586,233 | Anschutz-Kaempfe | May 25, 1926 |